(12) United States Patent
Sztorc

(10) Patent No.: US 11,878,749 B2
(45) Date of Patent: Jan. 23, 2024

(54) TANDEM WALKING BEAM SUSPENSION SYSTEM FOR A TRACK-MOUNTED VEHICLE

(71) Applicant: UTV INTERNATIONAL, Montreal (CA)

(72) Inventor: Andy Sztorc, Montreal (CA)

(73) Assignee: UTV International, Montreal (CA)

( * ) Notice: Subject to any disclaimer, the term of this patent is extended or adjusted under 35 U.S.C. 154(b) by 0 days.

(21) Appl. No.: 17/056,223

(22) PCT Filed: May 28, 2019

(86) PCT No.: PCT/CA2019/050721
§ 371 (c)(1),
(2) Date: Nov. 17, 2020

(87) PCT Pub. No.: WO2019/227204
PCT Pub. Date: Dec. 5, 2019

(65) Prior Publication Data
US 2021/0221451 A1    Jul. 22, 2021

Related U.S. Application Data

(60) Provisional application No. 62/677,099, filed on May 28, 2018.

(51) Int. Cl.
*B62D 55/108*  (2006.01)
*B62D 55/10*  (2006.01)
(52) U.S. Cl.
CPC .......... *B62D 55/108* (2013.01); *B62D 55/10* (2013.01)

(58) Field of Classification Search
CPC ...... B62D 55/104; B62D 55/06; B62D 55/08; B62D 55/10; B62D 55/108; B62D 55/116; B62D 55/14
See application file for complete search history.

(56) References Cited

U.S. PATENT DOCUMENTS

| | | | |
|---|---|---|---|
| 1,412,366 A * | 4/1922 | Muret | B62D 55/10 192/21 |
| 1,579,245 A * | 4/1926 | Pennington | B62D 55/108 474/134 |

(Continued)

*Primary Examiner* — Jacob D Knutson
*Assistant Examiner* — Abigail R Hymel
(74) *Attorney, Agent, or Firm* — Philip A. Swain; Equinox IP Inc.

(57) ABSTRACT

The present disclosure relates to a tandem walking beam suspension system which comprises a main walking beam pivotably mounted to the vehicle sub-frame, a first pair of spaced apart and parallel secondary walking beams pivotably mounted about the main walking beam first end, a second pair of spaced apart and parallel secondary walking beams pivotably mounted about the main walking beam second end, a first pair of rollers rotatably mounted in-between and to the first pair of secondary walking beams, and a second pair of rollers rotatably mounted in-between and to the second pair of secondary walking beams, the first and second pairs of rollers being configured to roll along the track when the track-mounted vehicle is in displacement. The system may further comprise a compression device connecting the sub-frame and the main walking beam such as to provide vertical displacement of the main walking beam relatively to the sub-frame.

20 Claims, 19 Drawing Sheets

(56) References Cited

U.S. PATENT DOCUMENTS

| | | | | |
|---|---|---|---|---|
| 1,786,430 A | * | 12/1930 | Kegresse | B62D 55/104 |
| | | | | 305/134 |
| 2,041,599 A | * | 5/1936 | Fergusson | B62D 55/108 |
| | | | | 180/6.7 |
| 2,487,134 A | * | 11/1949 | Herold | B62D 55/108 |
| | | | | 305/133 |
| 3,285,676 A | * | 11/1966 | Hetteen | B62D 55/14 |
| | | | | 305/134 |
| 3,447,620 A | | 6/1969 | Schoonover | |
| 3,447,621 A | * | 6/1969 | Schoonover | B62D 55/07 |
| | | | | 180/9.56 |
| 3,473,619 A | | 10/1969 | Dion | |
| 4,077,483 A | * | 3/1978 | Randolph | A61G 5/04 |
| | | | | 180/907 |
| 4,519,654 A | * | 5/1985 | Satzler | B62D 55/1125 |
| | | | | 305/132 |
| 4,727,949 A | | 3/1988 | Rea | |
| 4,744,431 A | | 5/1988 | Stollinger | |
| 5,533,587 A | | 7/1996 | Dow | |
| 5,899,543 A | | 5/1999 | Lykken | |
| 6,880,651 B2 | | 4/2005 | Loh | |
| 9,409,611 B2 | | 8/2016 | Hellholm | |
| 9,505,454 B1 | * | 11/2016 | Kautsch | B62D 55/108 |
| 2007/0236085 A1 | | 10/2007 | Satzler et al. | |
| 2012/0271521 A1 | | 10/2012 | Nordberg | |
| 2016/0362150 A1 | * | 12/2016 | Kirchmair | B62D 55/112 |

* cited by examiner

TANDEM WALKING BEAM SUSPENSION SYSTEM FOR A TRACK-MOUNTED VEHICLE

CROSS-REFERENCE TO RELATED APPLICATIONS

This application claims priority from U.S. Provisional Patent Application No. 62/677,099 filed on May 28, 2018.

TECHNICAL FIELD

The present disclosure relates to suspension systems adapted for track-mounted vehicles. More particularly, the present disclosure relates to an improved walking beam suspension system for track-mounted vehicles and to methods of using the same.

BACKGROUND

Known track-mounted vehicles usually integrate walking beam suspension systems, connecting the rubber tracks and the track-mounted vehicle frame, to allow better maneuverability of the vehicle in harsh terrains. Appropriately designed track-mounted vehicles, such as military vehicles, excavators, bulldozers, off-road industrial vehicles, and the like, can have advantages in cases where good traction, good flotation and/or low ground pressure are required. In a typical walking beam suspension system, an endless loop of track passes around a pair of idlers. Bogie wheels or rollers pivotably mounted on a main walking beam, bear against the track between the idlers to transfer weight of the vehicle to the ground.

However, walking beam suspension systems adapted for track-mounted vehicles currently available on the market suffer from numerous shortcomings.

As track-mounted vehicles are operated in extreme road conditions (slopes, side slopes, rocks, uneven ground contour, bumps, etc.), there exists variations in the pressure applied by the rollers to the rubber track, providing the track itself to quickly wear out. Furthermore, typical walking beam suspension systems designed for track-mounted vehicles do not offer a sufficient number of degrees of freedom to maneuver over a variety of harsh terrain features such as bumps, side slopes, and trenches. Such lack in the available degrees of freedom limits the ability of such vehicles to negotiate turn without unevenly loading different parts of the track.

There is therefore a need for an improved walking beam suspension system adapted for a track-mounted vehicle, being provided with the freedom of motion required to properly distribute pressure along the track while navigating through rough and/or irregular terrain, including side slopes. There is also a need for an improved walking beam suspension system adapted for a track-mounted vehicle that would reduce vibrations, the likelihood of de-tracking or track overload, and the wear on the track.

SUMMARY

It is an object of the present disclosure to provide a tandem walking beam suspension system for track-mounted vehicles that overcomes or mitigates one or more disadvantages of known walking beam suspension systems or at least provides a useful alternative.

According to an embodiment, there is provided a tandem walking beam suspension system for a track-mounted vehicle defining a sub-frame and a track, the system comprising: a main walking beam pivotably mounted to the sub-frame of the track-mounted vehicle, the main walking beam defining a main walking beam first end and a main walking beam second end opposite the main walking beam first end; a first pair of parallel and spaced apart secondary walking beams pivotably mounted about the main walking beam first end; a second pair of parallel and spaced apart secondary walking beams pivotably mounted about the main walking beam second end; a first pair of rollers rotatably mounted in-between and to the first pair of parallel and spaced apart secondary walking beams; and a second pair of rollers rotatably mounted in-between and to the second pair of parallel and spaced apart secondary walking beams, the first and second pairs of rollers being configured to roll along the track when the track-mounted vehicle is in displacement.

According to another embodiment, there is provided the tandem walking beam suspension system as defined above, further comprising a compression device connecting the sub-frame and the main walking beam for providing vertical displacement of the main walking beam relatively to the sub-frame.

According to a further embodiment, there is provided the tandem walking beam suspension system as defined above, wherein the compression device comprises: a main casing fixedly mounted on the sub-frame, the main casing defining a main casing lower end, the main walking beam being pivotably mounted at the main casing lower end; and a spring-loaded mechanism slidably mounted within the main casing and adapted to displace between a fully released position and a fully compressed position.

According to yet another embodiment, there is provided the tandem walking beam suspension system as defined above, wherein the main walking beam comprises a main walking beam first opening at the main walking beam first end, a main walking beam second opening at the main walking beam second end, and a main walking beam third opening between the main walking beam first and second ends, the system further comprising: a main shaft fixedly mounted on the main casing at the main casing lower end, the main walking beam being pivotably mounted via the main walking beam third opening on the main shaft.

According to another embodiment, there is provided the tandem walking beam suspension system as defined above, further comprising a first secondary shaft connecting together the first pair of parallel and spaced apart secondary walking beams, the first secondary shaft defining a first secondary shaft first end and a first secondary shaft second end, one of the first pair of parallel and spaced apart secondary walking beams being pivotably mounted at the first secondary shaft first end, the other one of the first pair of parallel and spaced apart secondary walking beams being pivotably mounted at the first secondary shaft second end.

According to a further embodiment, there is provided the tandem walking beam suspension system as defined above, wherein the main walking beam is being pivotably mounted via the main walking beam first opening on the first secondary shaft.

According to yet another embodiment, there is provided the tandem walking beam suspension system as defined above, further comprising a second secondary shaft connecting together the second pair of parallel and spaced apart secondary walking beams, the second secondary shaft defining a second secondary shaft first end and a second secondary shaft second end, one of the second pair of parallel and spaced apart secondary walking beams being pivotably mounted at the second secondary shaft first end, the other one of the second pair of parallel and spaced apart secondary walking beams being pivotably mounted at the second secondary shaft second end.

According to another embodiment, there is provided the tandem walking beam suspension system as defined above, wherein the main walking beam is being pivotably mounted via the main walking beam second opening on the second secondary shaft.

According to a further embodiment, there is provided the tandem walking beam suspension system as defined above, further comprising an articulating member mounted on the main walking beam and connecting the first and second secondary shafts for allowing a tilting movement of the main walking beam relatively to the first and second pairs of parallel and spaced apart secondary walking beams.

According to yet another embodiment, there is provided the tandem walking beam suspension system as defined above, wherein the articulating member comprises an articulating member first element and an articulating member second element mounted on the main walking beam, the articulating member first element connecting the main shaft and the first secondary shaft for allowing a first independent tilting movement of the main walking beam relatively to the first pair of parallel and spaced apart secondary walking beams, the articulating member second element connecting the main shaft and the second secondary shaft for allowing a second independent tilting movement of the main walking beam relatively to the second pair of parallel and spaced apart secondary walking beams.

According to another embodiment, there is provided the tandem walking beam suspension system as defined above, wherein each secondary walking beam from the first and second pairs of parallel and spaced apart secondary walking beams comprises: an upper section; a lower section opposite the upper section; a pivot opening found within the upper section for receiving one of the first secondary shaft and the second secondary shaft; a first rotation opening found within the lower section for rotatably receiving one of the first or second pair of rollers; and a second rotation opening found within the lower section at a distance from the first rotation opening for rotatably receiving the other one of the first or second pair of rollers.

According to a further embodiment, there is provided the tandem walking beam suspension system as defined above, wherein the first pair of rollers comprises: a first roller shaft in a rotatable engagement with the first rotation openings of the first pair of parallel and spaced apart secondary walking beams; a second roller shaft in a rotatable engagement with the second rotation openings of the first pair of parallel and spaced apart secondary walking beams; a first roller member outwardly and peripherally extending from the first roller shaft for rolling along the track; and a second roller member outwardly and peripherally extending from the second roller shaft for rolling along the track.

According to yet another embodiment, there is provided the tandem walking beam suspension system as defined above, wherein the first roller member comprises a plurality of wheels outwardly and peripherally extending from the first roller shaft and the second roller member comprises a plurality of wheels outwardly and peripherally extending from the first roller shaft for rolling along the track.

According to another embodiment, there is provided the tandem walking beam suspension system as defined above, wherein the second pair of rollers comprises: a first roller shaft in a rotatable engagement with the first rotation openings of the second pair of parallel and spaced apart secondary walking beams; a second roller shaft in a rotatable engagement with the second rotation openings of the second pair of parallel and spaced apart secondary walking beams; a first roller member outwardly and peripherally extending from the first roller shaft for rolling along the track; and a second roller member outwardly and peripherally extending from the second roller shaft for rolling along the track.

According to a further embodiment, there is provided the tandem walking beam suspension system as defined above, wherein the first roller member comprises a plurality of wheels outwardly and peripherally extending from the first roller shaft and the second roller member comprises a plurality of wheels outwardly and peripherally extending from the first roller shaft for rolling along the track.

According to yet another embodiment, there is provided the tandem walking beam suspension system as defined above, wherein the main walking beam comprises a main walking beam first member pivotably mounted to the sub-frame of the track-mounted vehicle and a main walking beam second member pivotably mounted to the sub-frame of the track-mounted vehicle, each one of the main walking beam first and second members defining a main walking beam first end and a main walking beam second end opposite the main walking beam first end.

According to another embodiment, there is provided the tandem walking beam suspension system as defined above, wherein each one of the main walking beam first and second members comprises a main walking beam first opening at the main walking beam first end, and a main walking beam second opening at the main walking beam second end, the system further comprising: a main shaft fixedly mounted on the main casing at the main casing lower end, the main walking beam first and second members being pivotably mounted via the main walking beam second openings on the main shaft.

According to a further embodiment, there is provided the tandem walking beam suspension system as defined above, further comprising a track tensioning idler wheel system connected to the sub-frame to tension the track.

According to yet another embodiment, there is provided the tandem walking beam suspension system as defined above, further comprising at least one additional shock absorber connecting the sub-frame and the main walking beam.

According to another embodiment, there is provided the tandem walking beam suspension system as defined above, wherein the articulating member is made of a resilient material.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
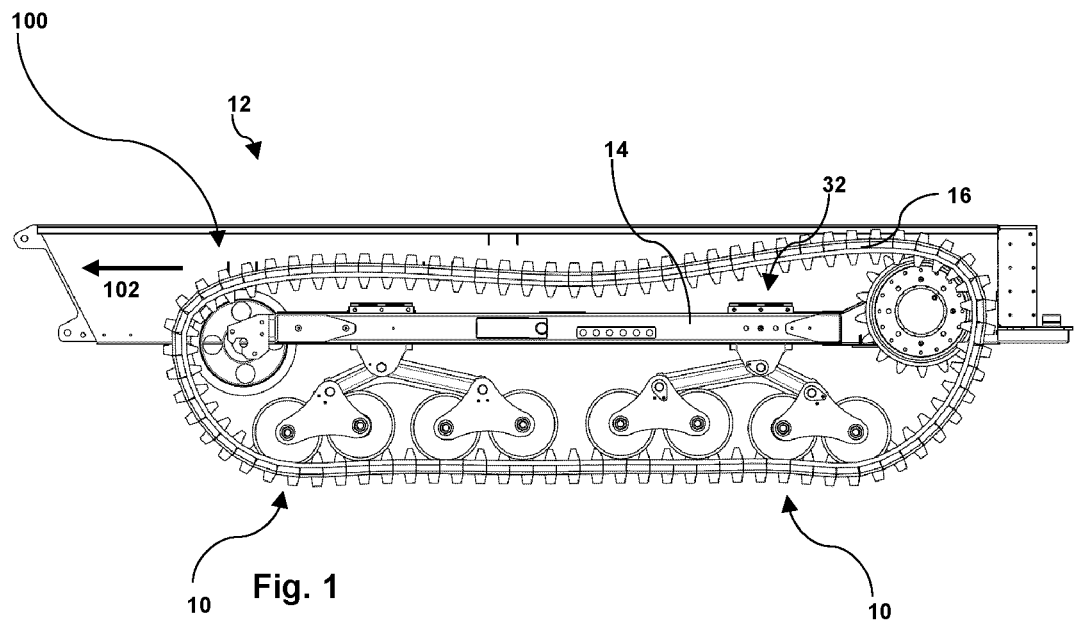
FIG. 1 is a first side elevation view of a track of a track-mounted vehicle which is provided with two independent tandem walking beam suspension systems in accordance with an embodiment.

Referring now to the drawings, and more particularly to FIGS. 1-14, there is shown tandem walking beam suspension systems 10, or systems 10, which are adapted for a track-mounted vehicle 12.

Figure 2:
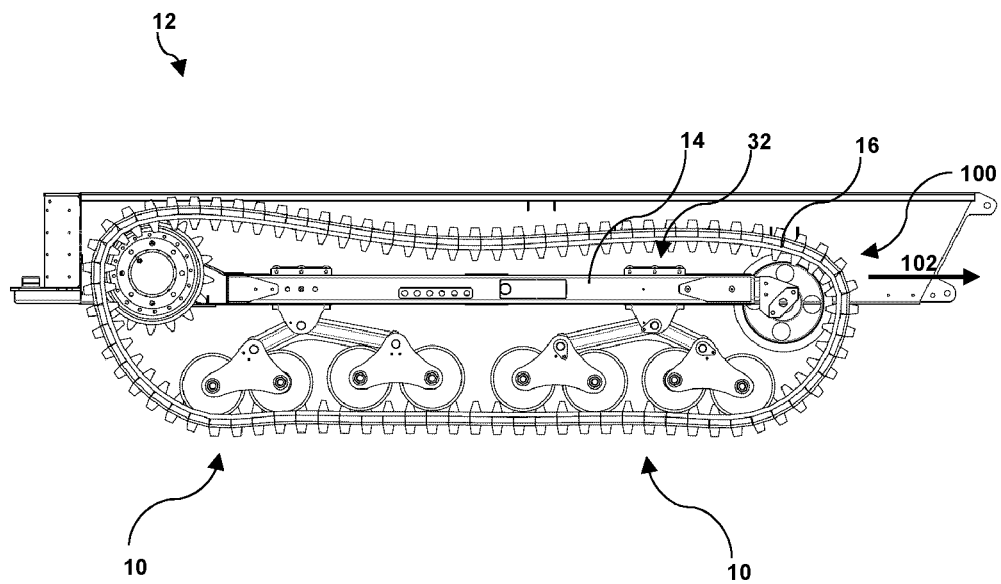
FIG. 2 is a second side elevation view of the track of FIG. 1 which is provided with two independent tandem walking beam suspension systems.
Figure 3:
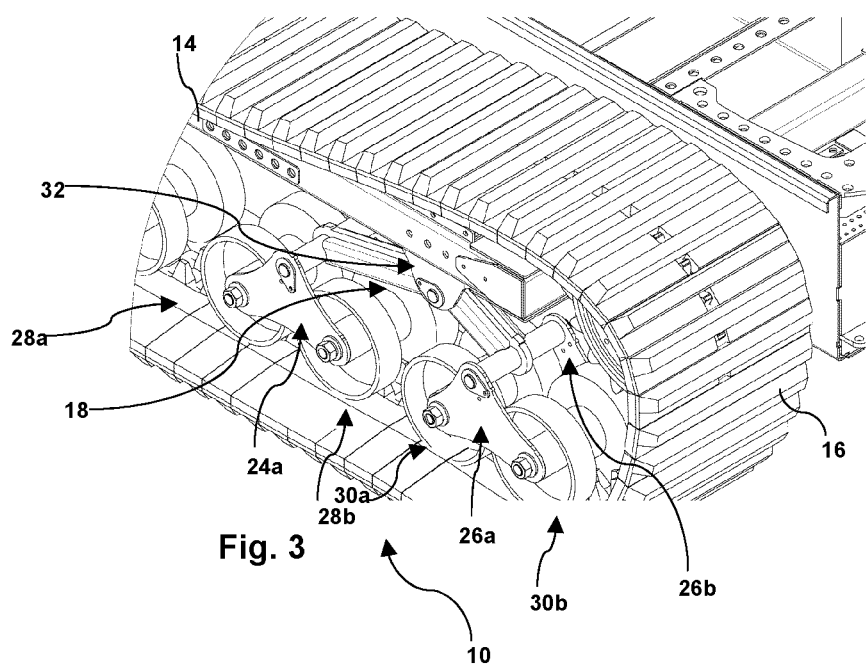
FIG. 3 is a top perspective view of one of the two independent tandem walking beam suspension systems shown in FIGS. 1 and 2, where the compression device is shown in its released position.
Figure 4:
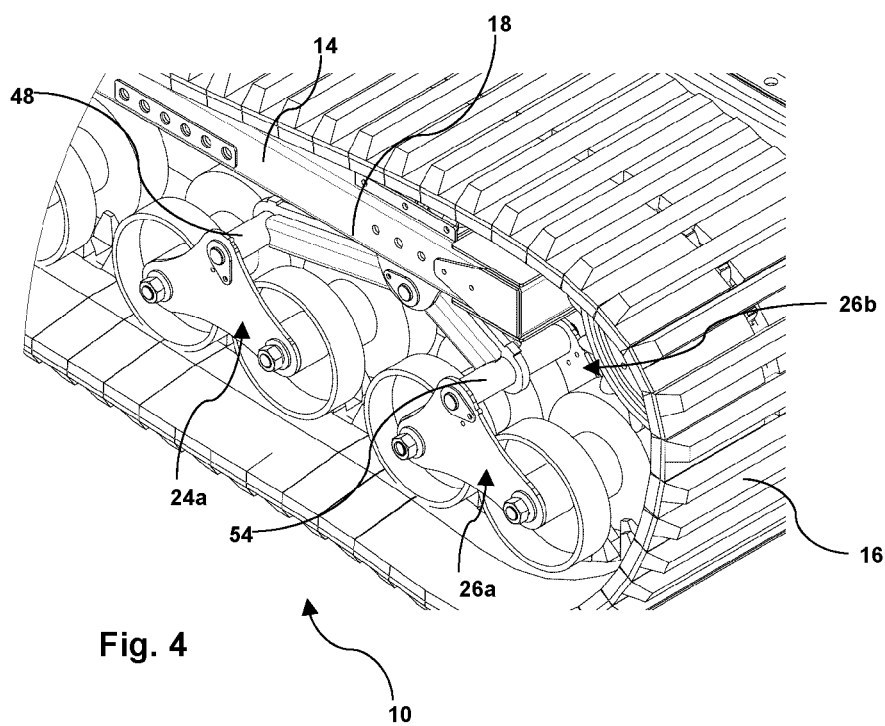
FIG. 4 is a top perspective view of the tandem walking beam suspension system of FIG. 3, where the compression device is shown in its compressed position.
Figure 5:
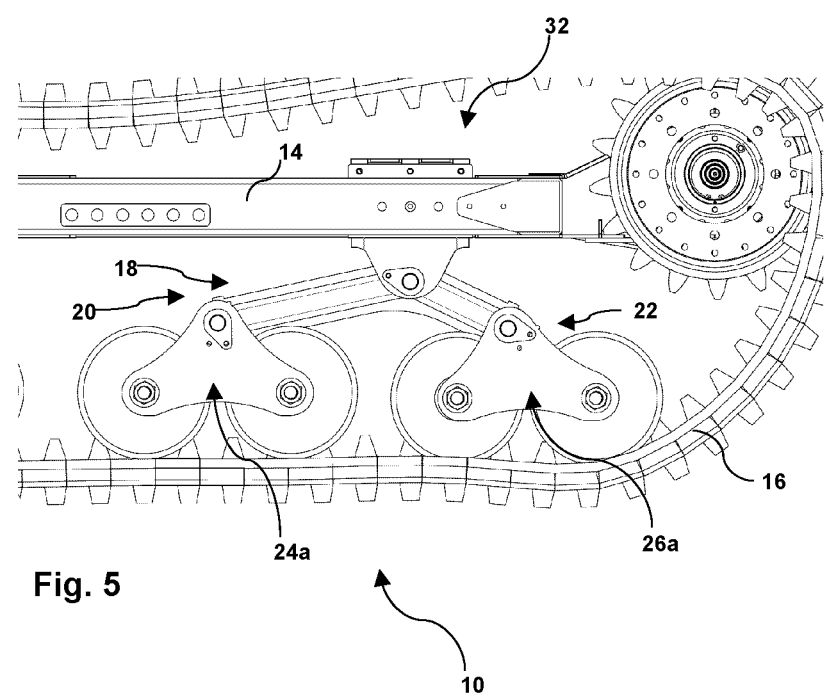
FIG. 5 is a side elevation view of the tandem walking beam suspension system of FIG. 3, where the compression device is shown in its fully released position.

As well illustrated in FIGS. 1 and 2, track-mounted vehicle 12 defines a sub-frame 14 and tracks 16 (only one track 16 illustrated). It is to be noted that even though track-mounted vehicle 12 of FIGS. 1 and 2 includes a total of four tandem walking beam suspension systems 10 (two systems 10 for each track 16), more or less systems 10 may be provided.

Still referring to FIGS. 1-14, there is shown that system 10 comprises a main walking beam 18, which is pivotably mounted to sub-frame 14 of track-mounted vehicle 12. Main walking beam 18 defines a main walking beam first end 20 and a main walking beam second end 22, found opposite main walking beam first end 20. System 10 further comprises a first pair of parallel and spaced apart secondary walking beams 24a, 24b, where each secondary walking beam 24a, 24b is pivotably mounted about main walking beam first end 20 such that it can pivot about a pivot axis. System 10 also comprises a second pair of parallel and spaced apart secondary walking beams 26a, 26b, where each secondary walking beam 26a, 26b is pivotably mounted about main walking beam second end 22 such that it can pivot about a pivot axis.

Still referring to FIGS. 1-14, there is shown that system 10 further comprises a first pair of rollers 28a, 28b, where each roller 28a, 28b is rotatably mounted in-between and to both secondary walking beams 24a, 24b such that it can rotate about a rotation axis. System 10 further comprises a second pair of rollers 30a, 30b, where each roller 30a, 30b is rotatably mounted in-between and to both secondary walking beams 26a, 26b such that it can rotate about a rotation axis. According to the configuration of system 10, each roller 28a, 28b, 30a, 30b is being configured to roll along/against track 16 when track-mounted vehicle 12 is in displacement. Rollers 28a, 28b, 30a, 30b therefore roll along track 16, distributing pressure along the track while track-mounted vehicle 12 navigates through varying terrains. Rollers will thus bear against a lower portion of the track, which includes a guide which engages with the rollers 28a, 28b, 30a, 30b.

Figure 6:
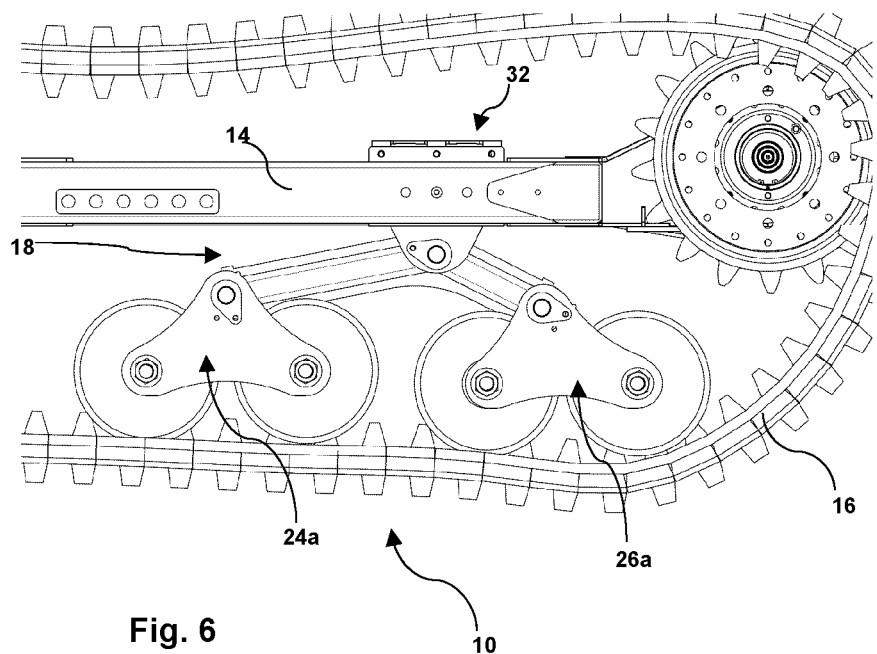
FIG. 6 is a side elevation view of the tandem walking beam suspension system of FIG. 3, where the compression device is shown in its fully compressed position.
Figure 7:
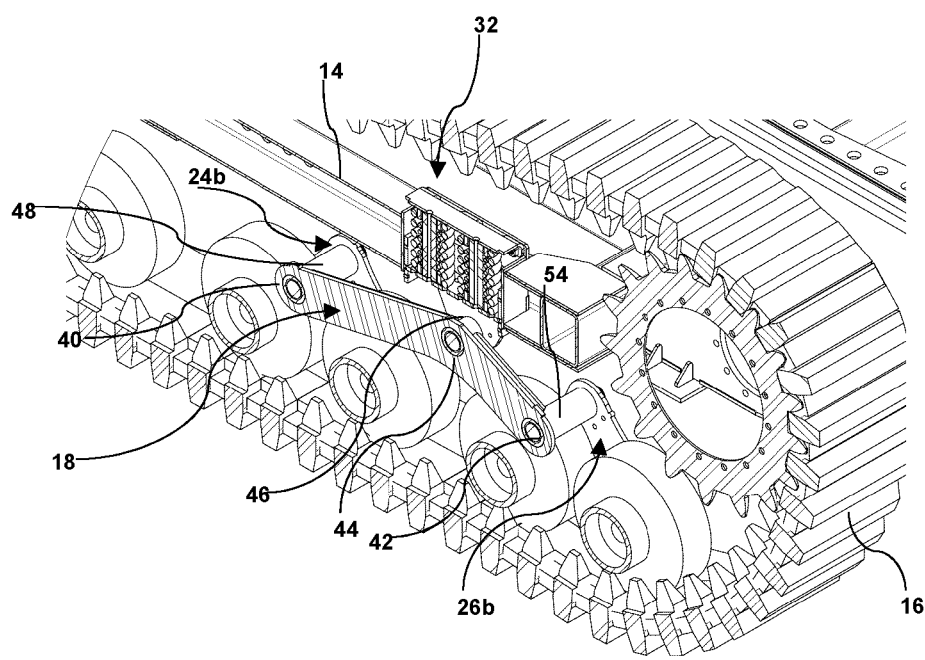
FIG. 7 is a top perspective cross-sectional view of the tandem walking beam suspension system of FIG. 3, where the compression device is shown in its fully released position.
Figure 8:
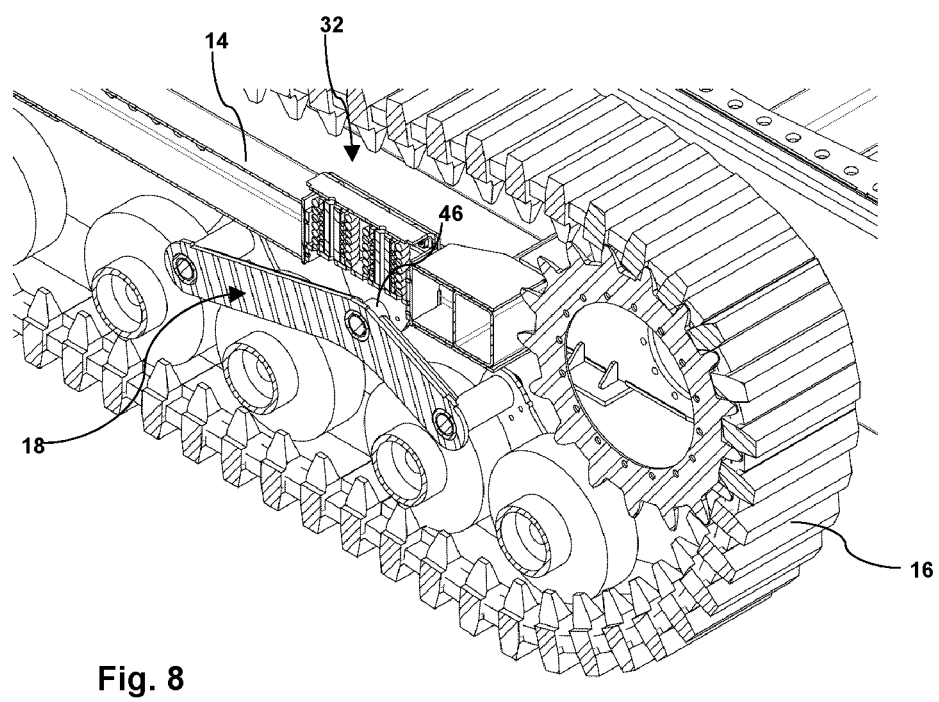
FIG. 8 is a top perspective cross-sectional view of the tandem walking beam suspension system of FIG. 3, where the compression device is shown in its fully compressed position.
Figure 9:
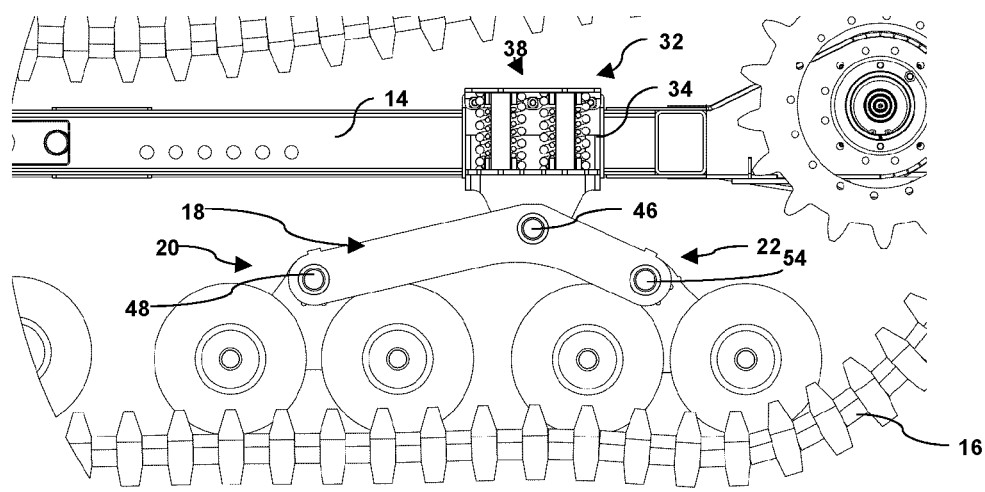
FIG. 9 is a side elevation view of the tandem walking beam suspension system of FIG. 3, where the compression device is shown in its fully released position.
Figure 10:
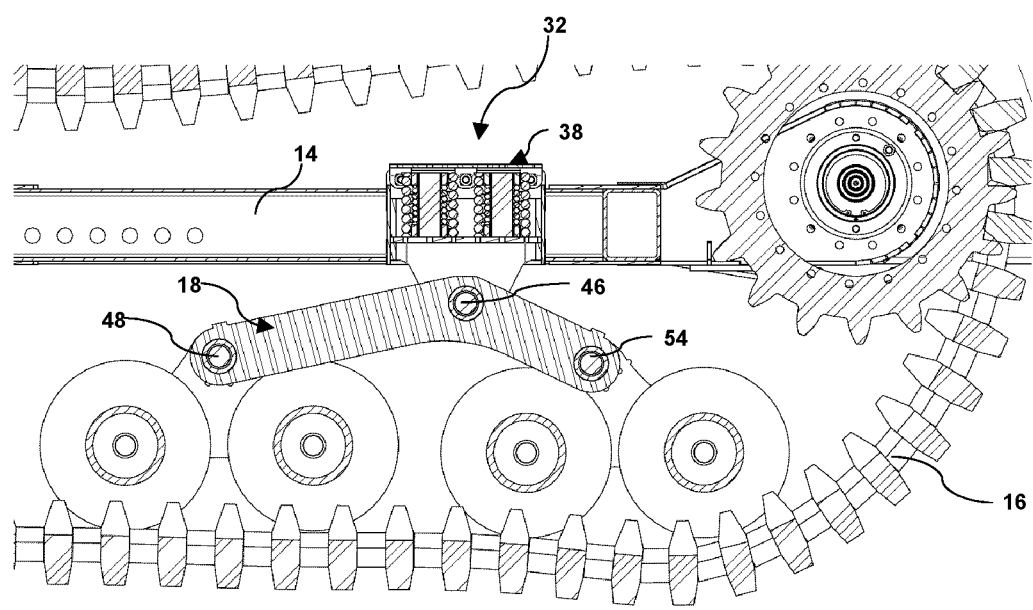
FIG. 10 is a side elevation view of the tandem walking beam suspension system of FIG. 3, where the compression device is shown in its fully compressed position.

Still referring to FIGS. 1-14, there is shown that system 10 further comprises a compression device 32 which connects sub-frame 14 and main walking beam 18 such as to provide vertical displacement of main walking beam 18 relatively to sub-frame 14. Compression device 32 comprises a main casing 34 which is fixedly mounted on sub-frame 14. Main casing 34 defines a main casing lower end 36. As shown, main walking beam 18 is pivotably mounted at main casing lower end 36. Compression device 32 further comprises a spring-loaded mechanism 38 which is slidably mounted within main casing 34 and adapted to displace between a fully released position (FIGS. 5 and 7) and a fully compressed position (FIGS. 6 and 8).

Still referring to FIGS. 1-14, there is shown that main walking beam 18 further includes a main walking beam first opening 40 at main walking beam first end 20, a main walking beam second opening 42 at main walking beam second end 22, and a main walking beam third opening 44 between main walking beam first and second ends 20, 22. System 10 further comprises a main shaft 46 which is fixedly mounted on main casing 34 at main casing lower end 36. Main walking beam 18 is therefore pivotably mounted via main walking beam third opening 44 on main shaft 46.

Still referring to FIGS. 1-14, there is shown that system 10 further comprises a first secondary shaft 48 which connects secondary walking beams 24a, 24b together. First secondary shaft 48 defines a first secondary shaft first end 50 and a first secondary shaft second end 52. As illustrated, secondary walking beam 24a is pivotably mounted at first secondary shaft first end 50, while secondary walking beam 24b is pivotably mounted at first secondary shaft second end 52. Main walking beam 18 is therefore pivotably mounted via main walking beam first opening 40 on first secondary shaft 48.

Still referring to FIGS. 1-14, there is shown that system 10 further comprises a second secondary shaft 54 which connects secondary walking beams 26a, 26b together. Second secondary shaft 54 defines a second secondary shaft first end 56 and a second secondary shaft second end 58. Secondary walking beam 26a is pivotably mounted at second secondary shaft first end 56, while secondary walking beam 26b is pivotably mounted at second secondary shaft second end 58. As illustrated, main walking beam 18 is being pivotably mounted via main walking beam second opening 42 on second secondary shaft 54.

Figure 11:
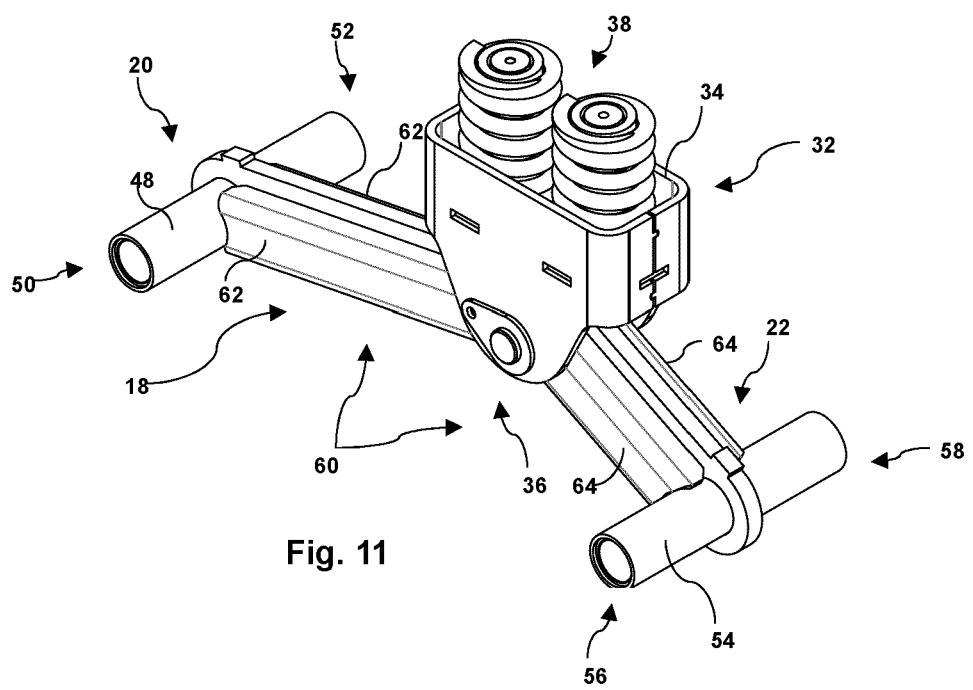
FIG. 11 is a top perspective view of part of the tandem walking beam suspension system shown in FIG. 3, illustrating the first and second secondary shafts, the main beam pivotably mounted thereon, and the compression device.
Figure 12:
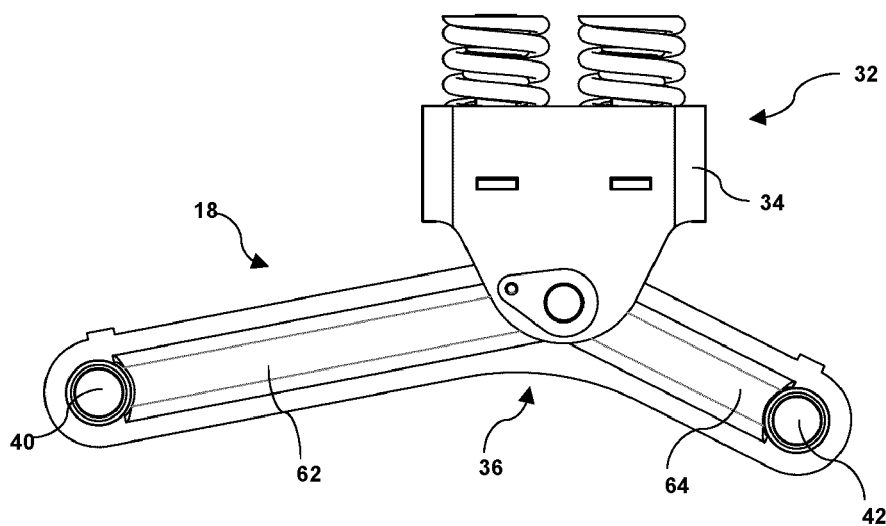
FIG. 12 is a side elevation view of the parts shown in FIG. 11.

Now referring to FIGS. 11 and 12, there is shown that tandem walking beam suspension system 10 further comprises an articulating member 60 which is mounted on main walking beam 18 which connects first and second secondary shafts 48, 54 for allowing a tilting movement of main walking beam 18 relatively to walking beams 24a, 24b, 26a, 26b. Articulating member may be made of a resilient material, such as of a rubber material, an elastomeric material, a polyurethane material, and the like.

Figure 19:
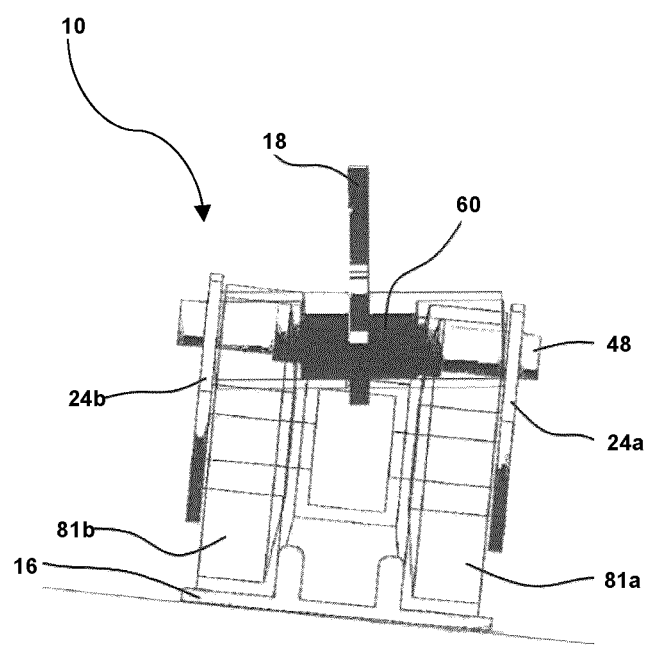
FIG. 19 is a front elevation view of a tandem walking beam suspension system mounted in a track-mounted vehicle, and further, where the track-mounted vehicle is travelling on an inclined contour or slope.

Still referring to FIGS. 11 and 12, and further to FIG. 19 there is shown that articulating member 60 comprises an articulating member first element 62 and an articulating member second element 64, both being mounted on main walking beam 18. Articulating member first element 62 connects main shaft 46 and first secondary shaft 48 for allowing a first independent tilting movement of main walking beam 18 relatively to secondary walking beams 24a, 24b, while articulating member second element 64 connects main shaft 46 and second secondary shaft 54 for allowing a second independent tilting movement of main walking beam 18 relatively to secondary walking beams 26a, 26b. Therefore, if track-mounted vehicle 12 travels in harsh terrain provided with an uneven ground contour (i.e., on an inclined slope), each system 10 will independently operate such as to allow secondary walking beams 24a, 24b, 26a, 26b to tilt relatively to main walking beam 18 as needed, based on the ground contour provided underneath tracks 16, so that each pair of secondary walking beams 24a, 24b and 26a, 26b is oriented substantially perpendicularly to the ground contour found underneath tracks 16 (FIG. 19). It is to be noted that secondary walking beams 24a, 24b will tilt the same way (secondary walking beams 24a, 24b will remain spaced apart and parallel during such operation), while secondary walking beams 26a, 26b will tilt the same way (secondary walking beams 26a, 26b will remain spaced apart and parallel during such operation). Articulating member first and second elements 62, 64, such as articulated flexible bushings 62, 64, offer a suspension movement across two degrees of freedom, allowing track-mounted vehicle 12 to articulate or to tilt in response to variations in pitch and roll, but by limiting the yaws as much as possible as this may damage tracks 16. As such, pressure is distributed evenly along tracks 16, regardless of the type of terrain encountered.

Referring now to FIG. 19, according to the configuration of system 10, despite the angle of an inclined slope for example, rollers 28a, 28b, 30a, 30b will remain in full contact with tracks 16 due to the articulation provided by articulating member 60 or articulating member first and second elements 62, 64. This ensures an even pressure distribution along the tracks 16 which promotes a longer lifespan of tracks 16. In addition, traction is therefore increased, vehicle vibrations are reduced and steering is improved. Providing two articulating members (first and second elements 62, 64), increases torsional stiffness of system 10.

Figure 13:
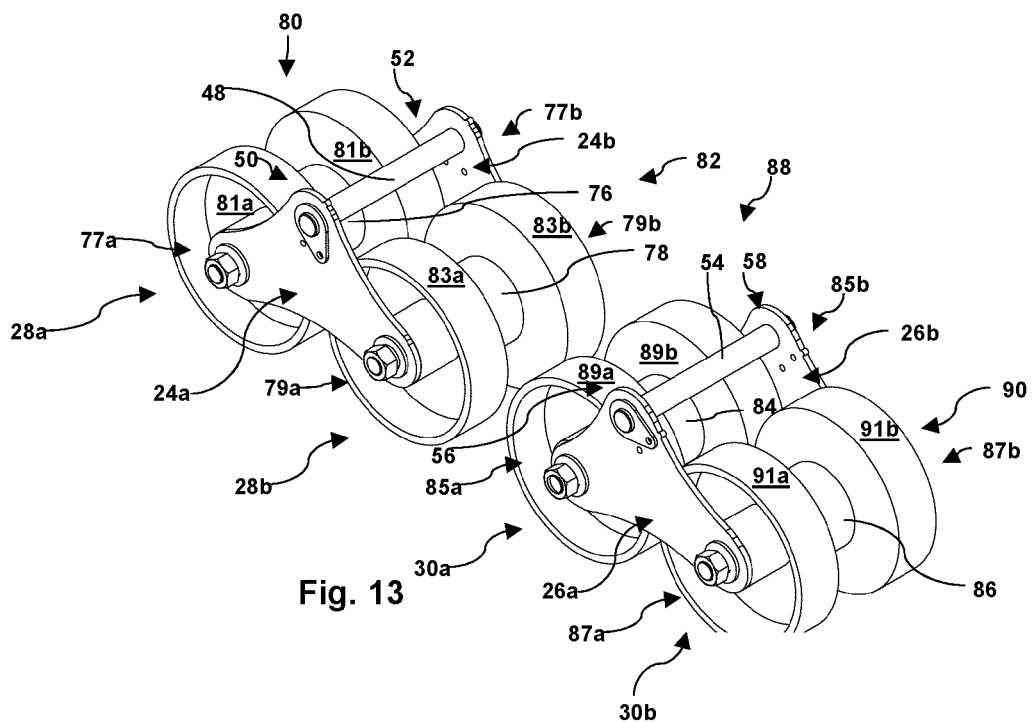
FIG. 13 is a top perspective view of part of the tandem walking beam suspension system shown in FIG. 3, illustrating first and second secondary shafts, first and second pairs of parallel and spaced apart secondary walking beams pivotably mounted thereon as well as first and second pairs of rollers rotatably mounted thereon.
Figure 14:
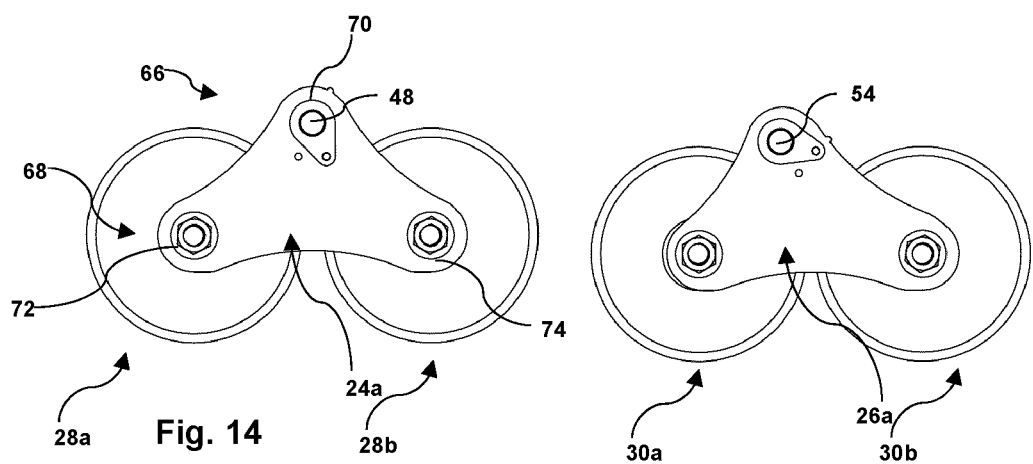
FIG. 14 is a side elevation view of the parts shown in FIG. 13.
Figure 15:
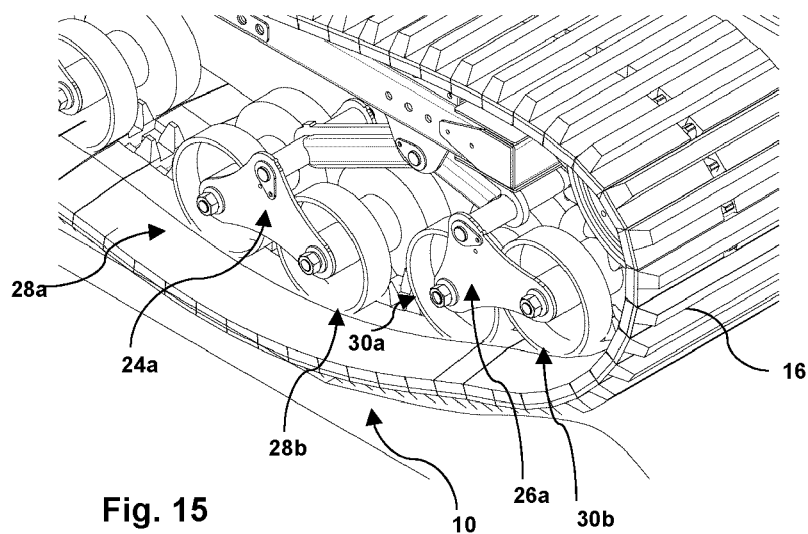
FIG. 15 is a top perspective view showing the tandem walking beam suspension system shown in FIG. 3 in operation when the track-mounted vehicle travels on harsh terrains.
Figure 16:
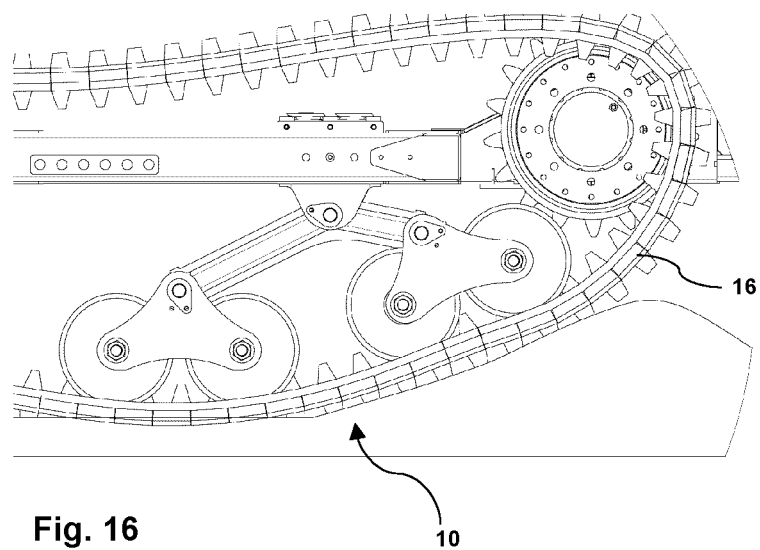
FIG. 16 is a side elevation view of the tandem walking beam suspension system shown in FIG. 15.
Figure 17:
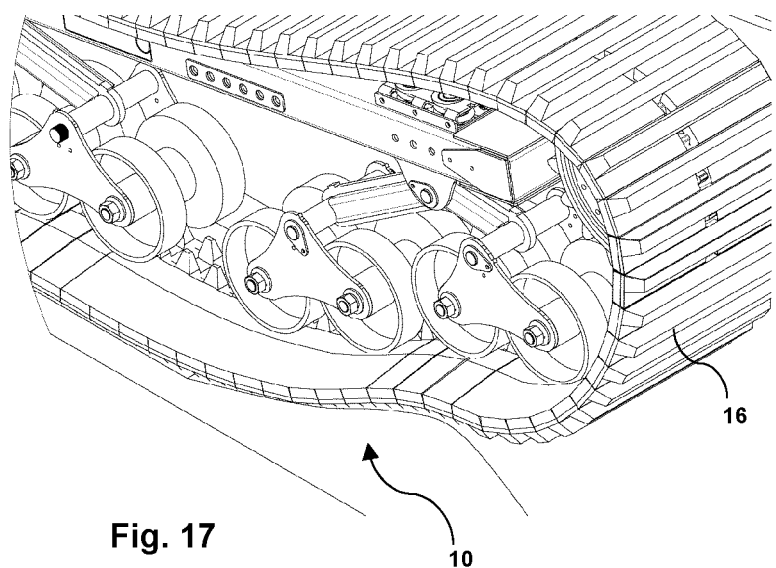
FIG. 17 is another top perspective view showing the tandem walking beam suspension system shown in FIG. 3 in operation when the track-mounted vehicle travels on harsh terrains.
Figure 18:
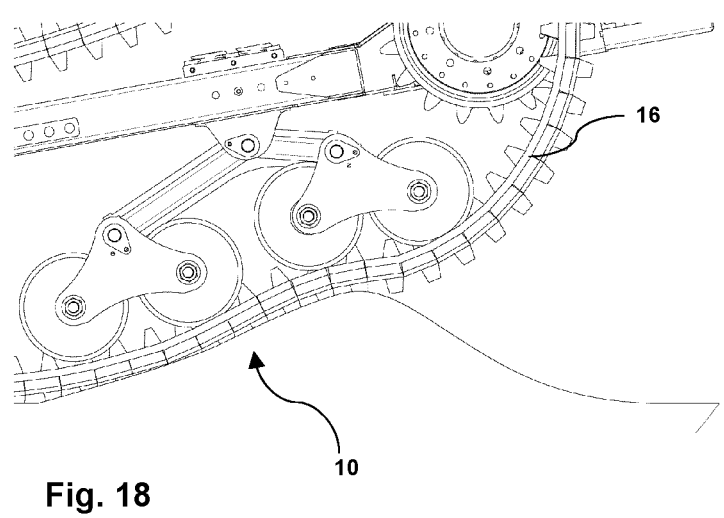
FIG. 18 is a side elevation view of the tandem walking beam suspension system shown in FIG. 17.

Now referring more particularly to FIGS. 13 and 14, there is shown that each secondary walking beam 24a, 24b, 26a, 26b (four secondary walking beams for one system 10) comprises an upper section 66, a lower section 68, found opposite upper section 66, a pivot opening 70, found within upper section 66 which is adapted to receive first secondary shaft 48 (first or second ends 50, 52) or second secondary shaft 54 (first or second ends 56, 58). Each secondary walking beam 24a, 24b, 26a, 26b further comprises a first rotation opening 72, which is found within lower section 68 for rotatably receiving rollers 28a or 30a, and a second rotation opening 74, which is found within lower section 68 at a distance from first rotation opening 72, for rotatably receiving rollers 28b, 30b.

Still referring to FIGS. 13 and 14, there is shown that first pair of rollers 28a, 28b comprises a first roller shaft 76, defining a first roller shaft first end 77a and a first roller shaft second end 77b in a rotatable engagement with first rotation openings 72 of parallel and spaced apart secondary walking beams 24a, 24b, and a second roller shaft 78, defining a second roller shaft first end 79a and a second roller shaft second end 79b found opposite second roller shaft first end 79a, in a rotatable engagement with second rotation openings 74 of parallel and spaced apart secondary walking beams 24a, 24b. First pair of rollers 28a, 28b further comprises a first roller member 80 which outwardly and peripherally extends from first roller shaft 76 and adapted to roll/travel along track 16, and a second roller member 82 which outwardly and peripherally extends from second roller shaft 78 and also adapted to roll/travel along track 16.

Still referring to FIGS. 13 and 14, there is shown that first roller member 80 comprises two spaced apart wheels or bogue wheels 81a, 81b which outwardly and peripherally extends from first roller shaft 76 and further, second roller member 82 comprises two spaced apart wheels or bogue wheels 83a, 83b which outwardly and peripherally extends from second roller shaft 78 to roll/travel along track 16. It is to be noted that a person skilled in the art to which system 10 pertains would understand that the configuration of rollers 28a, 28b (shown as two wheels 81a, 81b and two wheels 83a, 83b) may vary, as long as it allows system 10 to displace relatively to tracks 16 and according to the uneven contour found underneath tracks 16.

Still referring to FIGS. 13 and 14, there is shown that second pair of rollers 30a, 30b comprises a first roller shaft 84, defining a first roller shaft first end 85a and a first roller shaft second end 85b in a rotatable engagement with first rotation openings 72 of parallel and spaced apart secondary walking beams 26a, 26b, and a second roller shaft 86, defining a second roller shaft first end 87a and a second roller shaft second end 87b found opposite second roller shaft first end 87a, in a rotatable engagement with second rotation openings 74 of parallel and spaced apart secondary walking beams 26a, 26b. Second pair of rollers 30a, 30b further comprises a first roller member 88 which outwardly and peripherally extends from first roller shaft 84 and adapted to roll/travel along track 16, and a second roller member 90 which outwardly and peripherally extends from second roller shaft 86 and also adapted to roll/travel along track 16.

Still referring to FIGS. 13 and 14, there is shown that first roller member 88 comprises two spaced apart wheels 89a, 89b which outwardly and peripherally extend from first roller shaft 84 and further, second roller member 90 comprises two spaced apart wheels 91a, 91b which outwardly and peripherally extend from second roller shaft 86 to roll/travel along track 16. It is to be noted that a person skilled in the art to which system 10 pertains would understand that the configuration of rollers 30a, 30b (shown as two wheels 89a, 89b and two wheels 91a, 91b) may vary, as long as it allows system 10 to displace relatively to tracks 16 and according to the uneven contour found underneath tracks 16.

It is also to be noted that a person skilled in the art to which tandem walking beam suspension system 10 pertains would understand that main walking beam 18 may include a main walking beam first member (not shown) which is pivotably mounted to sub-frame 14 of track-mounted vehicle 12 and a main walking beam second member (not shown) which is also pivotably mounted to sub-frame 14 of track-mounted vehicle 12. According to such a scenario, each one of the main walking beam first and second members would define a main walking beam first end and a main walking beam second end opposite the main walking beam first end. Each one of the main walking beam first and second members would further comprises a main walking beam first opening at the main walking beam first end, and a main walking beam second opening at the main walking beam second end. In this case, main shaft 46 would be similarly and fixedly mounted on main casing 34 at main casing lower end 36. The main walking beam first and second members would be pivotably mounted via main walking beam second openings on the main shaft. Such configuration may provide an independent articulation of the main walking beam first and second members which may offer a more precise on rough or irregular terrain.

A person skilled in the art to which system 10 pertains would further understand that main walking beam 18 may take any shape, size and configuration, as long as it allows a pivot connection at a pivot point with sub-frame 14 and further, as long as it allows a first pivot connection at main walking beam first end 20 with first pair of parallel and spaced apart secondary walking beams 24a, 24b and a second pivot connection at main walking beam second end 22 with second pair of parallel and spaced apart secondary walking beams 26a, 26b (See FIG. 11).

It is to be noted that tandem walking beam suspension system 10 may further comprise a track tensioning idler wheel system 100 (FIGS. 1 and 2) connected to sub-frame 14 to help in tensioning the track. Hydraulically actuated, the idler wheel is pushed in the direction of arrow 102 such as to add tension to the track.

It is also to be noted that a person skilled in the art to which system 10 pertains would understand that the tandem walking beam suspension system 10 may further comprising at least one additional shock absorber (not shown) connecting sub frame 14 and walking frame 18. Such shock absorber may help in controlling vertical movement of system 10 and may apply additional and distributed pressure against rollers 28a, 28b, 30a, 30b.

Alternatively, it is to be noted that compression device 10 connecting sub-frame 14 and main walking beam 18 may take any shape, size and configuration, as long as it allows vertical displacement of main walking beam 18 relatively to sub-frame 14, providing comfort to occupants of track-mounted vehicle 12.

Integration of tandem walking beam suspension systems 10 described above within a track-mounted vehicle 12 therefore provides freedom of motion required to properly distribute pressure along tracks 16 while navigating through rough, uneven and/or irregular terrain (ground contour/surface). Tandem walking beam suspension systems 10 further reduce vibrations, the likelihood of de-tracking or track overload, and the wear on tracks 16.

Tandem walking beam suspension system 10 also improves traction to yield higher efficiency by improving the conformity of tracks 16 to the ground. Track-mounted vehicles, such as vehicles 12, which are equipped with tandem walking beam suspension systems 10 as described above, can also maneuver over larger obstacles than currently available track-mounted vehicles (that are not provided with systems 10), while keeping an interesting level of comfort for its occupants (even when the vehicle is travelling over side slopes, thanks to the articulating member that allows the main walking beam to tilt relatively to the two pairs of spaced apart secondary walking beams). Indeed, tandem walking beam suspension system 10 as described above improves steering and offers a smoother ride for the operator of the track-mounted vehicle 12 when compared to what offers currently available track-mounded vehicles.

Although the present invention has been described hereinabove by way of specific embodiments thereof, it can be modified, without departing from the spirit and nature of the subject invention defined in the appended claims.

The invention claimed is:

1. A tandem walking beam suspension system for a track-mounted vehicle defining a sub-frame and a track, the system comprising:
a main walking beam defining a main walking beam first end and a main walking beam second end opposite the main walking beam first end, the main walking beam being pivotally supported by the sub-frame of the track-mounted vehicle to define a pivot axis intermediate the main walking beam first and second ends;
a first pair of parallel and spaced apart secondary walking beams pivotably mounted about the main walking beam first end;
a second pair of parallel and spaced apart secondary walking beams pivotably mounted about the main walking beam second end;
a first pair of rollers rotatably mounted in-between and to the first pair of parallel and spaced apart secondary walking beams;
a second pair of rollers rotatably mounted in-between and to the second pair of parallel and spaced apart secondary walking beams, the first and second pairs of rollers being configured to roll along the track when the track-mounted vehicle is in displacement; and
a compression device interconnecting the sub-frame and the main walking beam at the pivot axis thereof and configured for providing vertical displacement of the main walking beam including the pivot axis relative to the sub-frame.

2. The tandem walking beam suspension system of claim 1, wherein the compression device comprises:
a main casing fixedly mounted on the sub-frame, the main casing defining a main casing lower end, the main walking beam being pivotably mounted at the main casing lower end; and
a spring-loaded mechanism slidably mounted within the main casing and adapted to displace between a fully released position and a fully compressed position.

3. The tandem walking beam suspension system of claim 2, wherein the main walking beam comprises a main walking beam first opening at the main walking beam first end, a main walking beam second opening at the main walking beam second end, and a main walking beam third opening between the main walking beam first and second ends, the system further comprising: —a main shaft fixedly mounted on the main casing at the main casing lower end, the main walking beam being pivotably mounted via the main walking beam third opening on the main shaft.

4. The tandem walking beam suspension system of claim 3, further comprising a first secondary shaft connecting together the first pair of parallel and spaced apart secondary walking beams, the first secondary shaft defining a first secondary shaft first end and a first secondary shaft second end, one of the first pair of parallel and spaced apart secondary walking beams being pivotably mounted at the first secondary shaft first end, the other one of the first pair of parallel and spaced apart secondary walking beams being pivotably mounted at the first secondary shaft second end.

5. The tandem walking beam suspension system of claim 4, wherein the main walking beam is being-pivotably mounted via the main walking beam first opening on the first secondary shaft.

6. The tandem walking beam suspension system of claim 4, further comprising a second secondary shaft connecting together the second pair of parallel and spaced apart secondary walking beams, the second secondary shaft defining a second secondary shaft first end and a second secondary shaft second end, one of the second pair of parallel and spaced apart secondary walking beams being pivotably mounted at the second secondary shaft first end, the other one of the second pair of parallel and spaced apart secondary walking beams being pivotably mounted at the second secondary shaft second end.

7. The tandem walking beam suspension system of claim 6, wherein the main walking beam is pivotably mounted via the main walking beam second opening on the second secondary shaft.

8. The tandem walking beam suspension system of claim 6, further comprising an articulating member mounted on the main walking beam and connecting the first and second secondary shafts and configured to permit a tilting movement of the main walking beam relative to the first and second pairs of parallel and spaced apart secondary walking beams.

9. The tandem walking beam suspension system of claim 8, wherein the articulating member comprises an articulating member first element and an articulating member second element mounted on the main walking beam, the articulating member first element connecting the main shaft and the first secondary shaft for allowing a first independent tilting movement of the main walking beam relative to the first pair of parallel and spaced apart secondary walking beams, the articulating member second element connecting the main shaft and the second secondary shaft for allowing a second independent tilting movement of the main walking beam relative to the second pair of parallel and spaced apart secondary walking beams.

10. The tandem walking beam suspension system of claim 8, wherein the articulating member is made of a resilient material.

11. The tandem walking beam suspension system of claim 6, wherein each secondary walking beam from the first and second pairs of parallel and spaced apart secondary walking beams comprises:
an upper section;
a lower section opposite the upper section;
a pivot opening found within the upper section for receiving one of the first secondary shaft and the second secondary shaft;
a first rotation opening found within the lower section for rotatably receiving one of the first or second pair of rollers; and
a second rotation opening found within the lower section at a distance from the first rotation opening for rotatably receiving the other one of the first or second pair of rollers.

12. The tandem walking beam suspension system of claim 11, wherein the first pair of rollers comprises:
a first roller shaft in a rotatable engagement with the first rotation openings of the first pair of parallel and spaced apart secondary walking beams;
a second roller shaft in a rotatable engagement with the second rotation openings of the first pair of parallel and spaced apart secondary walking beams;
a first roller member outwardly and peripherally extending from the first roller shaft for rolling along the track; and
a second roller member outwardly and peripherally extending from the second roller shaft for rolling along the track.

13. The tandem walking beam suspension system of claim 12, wherein the first roller member comprises a plurality of wheels outwardly and peripherally extending from the first roller shaft and the second roller member comprises a plurality of wheels outwardly and peripherally extending from the second roller shaft for rolling along the track.

14. The tandem walking beam suspension system of claim 11, wherein the second pair of rollers comprises:
a first roller shaft in a rotatable engagement with the first rotation openings of the second pair of parallel and spaced apart secondary walking beams;
a second roller shaft in a rotatable engagement with the second rotation openings of the second pair of parallel and spaced apart secondary walking beams;
a first roller member outwardly and peripherally extending from the first roller shaft for rolling along the track; and
a second roller member outwardly and peripherally extending from the second roller shaft for rolling along the track.

15. The tandem walking beam suspension system of claim 14, wherein the first roller member comprises a plurality of wheels outwardly and peripherally extending from the first roller shaft and the second roller member comprises a plurality of wheels outwardly and peripherally extending from the second roller shaft for rolling along the track.

16. The tandem walking beam suspension system of claim 2, wherein the main walking beam comprises a main walking beam first member pivotably mounted to the sub-frame of the track-mounted vehicle and a main walking beam second member pivotably mounted to the sub-frame of the track-mounted vehicle, each of the main walking beam first and second members defining a main walking beam first end and a main walking beam second end opposite the main walking beam first end having spaced apart first and second walking beam first and second ends.

17. The tandem walking beam suspension system of claim 16, wherein:
each one of the main walking beam first and second members includes a main walking beam first opening at the main walking beam first end, a main walking beam second opening at the main walking beam second end, and a third opening located between the first and second openings; and the system further comprising:
a main shaft fixedly mounted on the main casing at the main casing lower end, the main walking beam first and second members being pivotably mounted via the main walking beam third openings on the main shaft.

18. The tandem walking beam suspension system of claim 1, further comprising a track tensioning idler wheel system connected to the sub-frame to tension the track.

19. The tandem walking beam suspension system of claim 1, further comprising at least one additional shock absorber connecting the sub-frame and the main walking beam.

20. A track-mounted vehicle comprising:
- a sub-frame;
- a track; and
- a tandem walking beam suspension interconnecting the sub-frame and the track, wherein the tandem walking beam suspension comprises:
  - a main walking beam defining a main walking beam first end and a main walking beam second end opposite the main walking beam first end, the main walking beam being pivotally supported by the sub-frame of the track-mounted vehicle to define a pivot axis intermediate the main walking beam first and second ends;
  - a first pair of parallel and spaced apart secondary walking beams pivotably mounted about the main walking beam first end;
  - a second pair of parallel and spaced apart secondary walking beams pivotably mounted about the main walking beam second end;
  - a first pair of rollers rotatably mounted in-between and to the first pair of parallel and spaced apart secondary walking beams;
  - a second pair of rollers rotatably mounted in-between and to the second pair of parallel and spaced apart secondary walking beams, the first and second pairs of rollers being configured to roll along the track when the track-mounted vehicle is in displacement; and
  - a compression device interconnecting the sub-frame and the main walking beam at the pivot axis thereof, wherein the compression device is configured to provide vertical displacement of the main walking beam including the pivot axis relative to the sub-frame.

* * * * *